United States Patent [19]

Jaecks

[11] 4,241,584

[45] Dec. 30, 1980

[54] VARIABLE BIASED HYDRAULIC ENGINE SPEED CONTROL

[75] Inventor: Bruce K. Jaecks, Wauwau, Wis.

[73] Assignee: J. I. Case Company, Racine, Wis.

[21] Appl. No.: 60,353

[22] Filed: Jul. 25, 1979

[51] Int. Cl.³ .............................................. B60T 11/24
[52] U.S. Cl. ........................................ 60/580; 60/591
[58] Field of Search ................. 60/533, 557, 567, 568, 60/569, 580, 581, 591

[56] References Cited

U.S. PATENT DOCUMENTS

| | | | |
|---|---|---|---|
| 2,414,302 | 1/1947 | Hebel | 60/567 |
| 2,855,755 | 10/1958 | Auger | 60/567 |

*Primary Examiner*—Abraham Hershkovitz

*Attorney, Agent, or Firm*—Dressler, Goldsmith, Shore, Sutker & Milnamow, Ltd.

[57] ABSTRACT

An apparatus for holding the speed of an engine to a fixed level with provision for increasing engine speed above that setting without losing the set point. A combination of piston and cylinder assemblies are joined together to control engine speed. An equipment attendant pressurizes one end of a closed hydraulic system to activate a hydraulic operator to change engine speed. Shutting an isolation valve, hydraulically locks that speed setting into the engine. With the isolation valve shut, a biased, bypass piston and cylinder assembly is activated to increase engine speed. The bypass piston and cylinder assembly is actuated by the same device used by the equipment attendant to pressurize the hydraulic system control initially.

4 Claims, 3 Drawing Figures

VARIABLE BIASED HYDRAULIC ENGINE SPEED CONTROL

DESCRIPTION

1. Technical Field

A hydraulic apparatus for setting the speed of an engine to a reference value while allowing for temporary speed increases above the reference speed without having to re-establish the reference setting.

Frequently, in the operation of a vehicle it becomes necessary to set the speed of an engine to a predetermined value above normal idling speed so as to provide sufficient power for the operation of equipment powered by the engine. During this mode of operation it may be necessary to increase the speed or power of the engine. It would be convenient to be able to temporarily increase the speed of the engine without having to reset the engine speed to the prior level.

2. Background Art

A device permitting the speed of an engine to be temporarily increased above a predetermined value is described by H. S. Wassel in application Ser. No. 60,354, filed July 25, 1979, entitled "Variable Speed Throttle Control", and assigned to the assignee of the present invention and co-pending with this application. The device by Wassel uses a system of lockable lever arms joined by a flexible linkage.

Such a device is suitable for those applications where the controls are relatively fixed in location and where the linkages and cables can be positioned in a relatively straight line relationship. In those applications where the control stations are remotely located from each other—or where a single control station is used that cannot be conveniently linked to the engine—or where an amplification of forces is needed—hydraulics, pneumatics or electrohydraulic systems are more suitable for setting and controlling engine speed.

SUMMARY OF THE INVENTION

The present invention provides a method for locking the speed of an engine at a given setting while at the same time providing for short term increases in speed without affecting the setting or the bias level previously established for the operation of the engine. In the system, a master hydraulic controller positions a slave hydraulic actuator. The slave actuator in turn positions the engine speed regulator or governor. The master controller is manipulated by the equipment attendant. Suitable conduit joins the slave actuator and master controller. A second pressurization path is provided between the master controller and slave actuator. This second path is hydraulicly isolated from the first path by a combination of hydraulic pistons and cylinders.

When the equipment attendant wishes to raise the speed of the engine, he positions the master controller which causes the slave actuator to position the engine speed regulator thereby increasing the speed of the engine. When the desired speed has been reached, a valve is shut in the hydraulic line joining the master controller and slave actuator thereby providing a "hydraulic lock" keeping the slave hydraulic actuator in the position previously established by the master hydraulic controller. Once the isolation valve is shut, the equipment attendant can release his speed adjusting controls; the engine will remain at the selected speed setting.

The second path provided "by passes" the isolation valve. Should the speed adjusting controls be manipulated by the equipment attendant after the isolation valve is shut, hydraulic pressure will be directed to a second slave hydraulic actuator and, through a mechanical linkage, to a slave hydraulic controller. This slave hydraulic controller increases the hydraulic pressure in the line joined to the slave actuator connected to the engine speed regulator thereby causing a temporary increase in engine power or speed. Once the need for this additional speed has passed, the equipment attendant can release the master hydraulic controller. The second slave actuator is biased to a depressurized position by a biasing means. The removal of hydraulic pressure from the master controller causes the second slave actuator to return to its original position and the slave hydraulic controller is also withdrawn. This reduces the hydraulic pressure on the hydraulic slave actuator joined to the engine speed regulator which causes it to return to its original position. Consequently, the engine speed is returned to its previous setting.

Should the equipment attendant desire to change the speed setting of the engine or completely shut down the engine, he need only open the isolation valve. This will cause the slave actuator joined to the engine to position the engine speed regulator to the idle or off position. Alternatively a new speed setting may be inserted.

DESCRIPTION OF THE INVENTION

Figure 1:
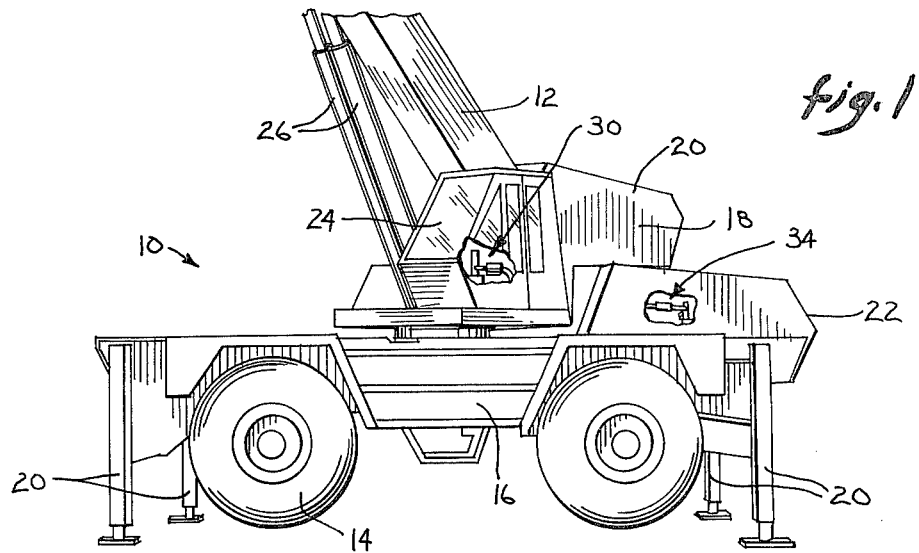
FIG. 1 is an overall view of a vehicle employing the hydraulic engine speed setter of the present invention.

While this invention is susceptible to embodiment in many different forms, there is shown in the drawings and will herein be described in detail an embodiment with the understanding that the present disclosure is to be considered as an exemplification of the principles of the invention and is not intended to limit the invention to the embodiment illustrated.

FIG. 1 of the drawing shows a vehicle generally designated by reference numeral 10 having a working arm or boom 12 supported thereon. The specific device has four support wheels 14 which are self-propelled and move in pairs for steering. These wheels support an undercarriage 16 upon which a revolving superstructure 18 is pivoted. For stability, four hydraulic operated outriggers 20 are provided at each corner of the vehicle. Mounted on the undercarriage is main engine 22. A power winch 20 and other hydraulically powered devices are contained within the revolving superstructure 18. An operator's cab 24 pivots and is a part of the revolving superstructure. Within this cab the equipment attendant controls the hydraulic cylinders 26 manipulating the boom 12 and also controls various other functions as well as moving the vehicle from one site to another.

In modern implements of the type described, the equipment attendant while sitting in his cab 24 may manipulate or actuate the outriggers 20, the vehicle support wheels 14 and the engine 22 to move the vehicle as the need arises in order to "work his load."

Typical among his controls is an actuating means 30 or lever arm which operates a hydraulic piston and cylinder assembly 32. Since this hydraulic piston and cylinder assembly is operated directly by the equipment attendant it is frequently called the master controller or master control cylinder. Mounted within the engine compartment 22 is a second piston and cylinder assembly or actuator 34. This piston and cylinder assembly is manipulated or actuated by the hydraulic pressure derived from the master piston and cylinder controller 32. Consequently, it is frequently referred to as a "slave" piston and cylinder assembly. The slave piston and cylinder assembly in turn actuates a second lever arm 36 which positions the engine throttle or governor mechanism. The second lever arm is normally biased to a first position or idle position by a biasing spring 37. Thus, the equipment attendant within his cab has control of mechanical equipment remotely located.

Figure 2:
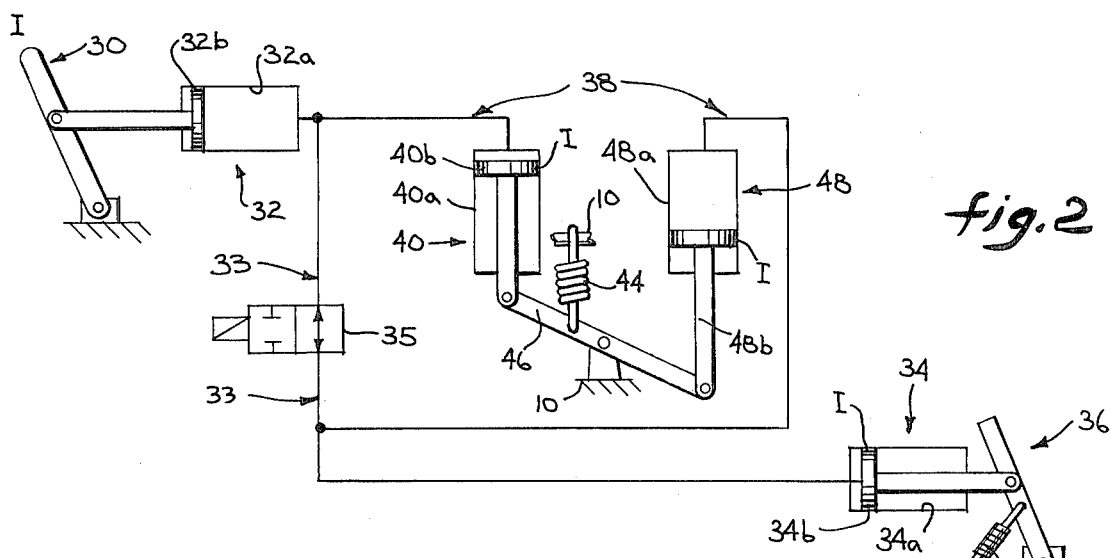
FIG. 2 is a schematic representation of the hydraulic control system before the isolation valve is shut.

FIG. 2 shows the hydraulic system of the present invention used to operate and adjust the speed of the engine. Under conventional terminology and in accordance with the techniques used by practitioners of the hydraulic and pneumatic control arts, the equipment attendant can remotely control the speed of an engine by a series of piston and cylinders joined by fluid piping or conduits. Specifically, the equipment attendant actuates a lever control 30 pivotally attached to the cab structure 24 which depresses a piston 32b in a so-called "master" hydraulic cylinder 32a. Hydraulic pressure is transmitted through a first passageway or conduit 33 past a normally opened isolation valve means 35 to a first slave piston and cylinder assembly 34. This pressurizes the piston 34b contained therein and manipulates the device attached thereto—typically represented by a pivoted lever arm 36 pivoted to the undercarriage 16 and controlling engine speed or power output.

Once the desired engine speed has been reached the equipment attendant can shut the isolation valve or valve means 35 in conduit 33 joining the master cylinder 32a to the slave cylinder 34a. This provides a "hydraulic lock" on the volume of fluid between the isolation valve and the slave piston and maintains a predetermined speed for the engine.

According to the primary aspect of the invention, the engine speed can be temporarily increased while still maintaining the previous setting or speed for the engine.

Referring to FIG. 2, a second path 38 "by-passes" the isolation valve 35 and contains two additional piston and cylinder assemblies. A second slave piston and cylinder assembly or actuator 40 includes a fixed cylinder 40a and a piston and rod 40b reciprocated therein. The free end of piston and rod 40b is connected to one end of a lever 46 and is normally biased to a first position (I) by biasing means or a spring 44. The opposite end of lever 46 is connected to a piston and rod 48b reciprocated in a cylinder 48a of a slave hydraulic controller 48.

Figure 3:
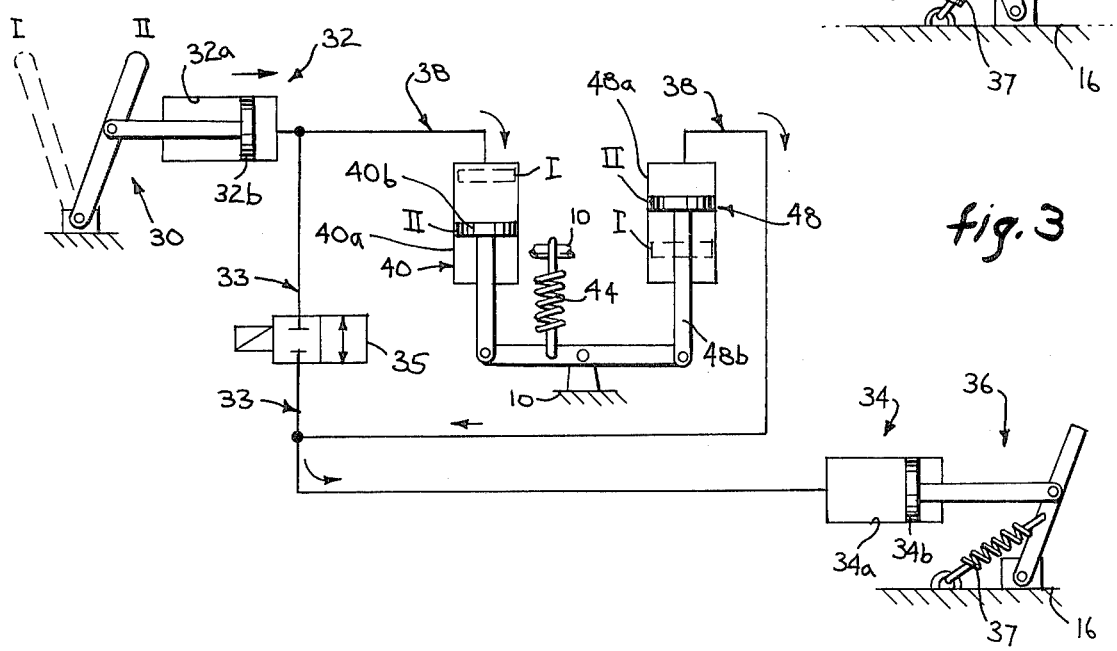
FIG. 3 is a schematic representation of the hydraulic control system after the isolation valve has been shut and after a reference speed has been set into the engine.

The biasing spring force and piston area are sized such that in "normal operation" (i.e., with the isolation valve 35 open) the master hydraulic piston and cylinder assembly 32 and slave piston and cylinder assembly 34 may be pressurized without affecting the piston and cylinders in the path 38 bypassing the isolation valve 35. With the isolation valve shut, hydraulic pressure induced by the master controller 32 will be transmitted to the second slave actuator or slave hydraulic controller 40. This pressure will be sufficient to overcome the biasing spring 44, as shown in FIG. 3. The pressurization of the slave controller in turn causes the slave actuator 34 connected to the engine control 36 to be positioned.

After the need for increased power or speed has passed, the equipment attendant needs only to release the master controller 32 to return the speed of the engine to the previously set value. Releasing the master controller 32 reduces the pressure on the second slave actuator 40. Because of the biasing means 44, the second slave actuator 40 in turn reduces the pressure applied to the slave controller 48, and this reduces the pressure applied to the slave actuator 34 connected to the engine controls. Thus, engine speed returns to the previous setting.

Returning to the apparatus shown in FIG. 2, whenever it is desired to lower the engine speed below the previously set value, the equipment attendant needs only open the isolation valve 35 and manipulate the master hydraulic controller 32 to achieve the desired power setting. He can then "lock" that speed in by shutting the isolation valve. Depending on the arrangement of the various components the isolation valve 35 may be remotely actuated. In particular, if the equipment attendant engages the transmission to move the vehicle a solenoid operated isolation valve can be made to automatically shift to the open position thereby returning the engine to the low idle speed. This will give the equipment attendant complete engine speed control while "roading" the vehicle. Should the equipment attendant need more engine speed for a short period of time he can advance the throttle with the accelerator locked. When the need for additional engine speed no longer exists, the throttle is released and the engine will return to the previous setting.

While the second path 38 is shown using a combination of two distinct piston and cylinder assemblies 40 and 48 joined by a pivoted lever 46, the same function could be achieved by a single cylinder and a single, biased, double acting piston. In that case the piston would isolate the two hydraulic fluid paths and serve as an interface between them.

What is claimed is as follows:

1. In a hydromechanical engine speed control system for a vehicle employing a master controller and a slave hydraulic actuator joined by hydraulic conduit, said master controller being manipulated by an equipment attendant, said slave actuator being coupled to a device regulating engine speed, wherein the improvement comprises:
   (a) isolation means in said hydraulic conduit for isolating said master controller from said slave actuator;
   (b) a slave hydraulic controller, said slave controller being in hydraulic communication with said slave actuator;
   (c) a second hydraulic actuator, said second actuator being in hydraulic communication with said master controller;
   (d) linkage means interconnecting said slave hydraulic controller and said second hydraulic actuator to move as a unit; and
   (e) biasing means defining a first position for said slave hydraulic controller and said second hydraulic actuator whereby said slave actuator is controlled directly by said master controller when said isolation means is open and said slave actuator is controlled through said slave hydraulic controller and said second hydraulic actuator when said isolation means is closed.

2. In a device as defined in claim 1 wherein said isolation means is remotely controlled and is opened when a transmission for said vehicle is engaged.

3. A hydraulic apparatus for setting the speed of a vehicle mounted engine comprising:

(a) changing means for changing engine speed;

(b) hydraulic means for positioning said changing means, said hydraulic means being manipulated by an equipment attendant and having a conduit connected with said changing means;

(c) means for isolating the hydraulic path defined by said conduit to isolate said changing means and said positioning means;

(d) a hydraulic actuation means responsive to said positioning means;

(e) a second hydraulic means responsive to said actuation means for operating said changing means;

(f) a biasing means for positioning said second hydraulic actuation means to a first position with said isolating means open, whereby upon manipulation of said positioning means—with said isolating means shut—said actuation means overcomes said biasing means to activate said operating means to activate said changing means thereby increasing said engine speed.

4. An apparatus as defined in claim 3, wherein said actuation means is joined to said operating means by a lever arm pivoted to said vehicle.

* * * * *